United States Patent [19]
Watanabe et al.

[11] Patent Number: 5,274,360
[45] Date of Patent: Dec. 28, 1993

[54] METHOD OF DETECTING POSITIONAL DISLOCATION OF CAMERA

[75] Inventors: Atsushi Watanabe; Taro Arimatsu, both of Minamitsuru, Japan

[73] Assignee: Fanuc Ltd., Minamitsuru, Japan

[21] Appl. No.: 834,289

[22] PCT Filed: May 28, 1991

[86] PCT No.: PCT/JP91/00723
§ 371 Date: Feb. 21, 1992
§ 102(e) Date: Feb. 21, 1992

[87] PCT Pub. No.: WO92/00167
PCT Pub. Date: Jan. 9, 1992

[30] Foreign Application Priority Data
Jun. 29, 1990 [JP] Japan ................... 2-171645

[51] Int. Cl.$^5$ ............................. G08B 21/00
[52] U.S. Cl. ................... 340/686; 318/568.16; 340/540; 340/679; 354/289.12
[58] Field of Search ............. 340/686, 540, 679; 318/568.16; 354/289.12, 289.1

[56] References Cited

U.S. PATENT DOCUMENTS

| | | | |
|---|---|---|---|
| 4,753,569 | 6/1988 | Pryor | 414/730 |
| 4,796,200 | 1/1989 | Pryor | 364/513 |
| 4,851,905 | 7/1989 | Pryor | 358/125 |
| 5,060,007 | 10/1991 | Egawa | 354/289.12 |
| 5,066,902 | 11/1991 | Watanabe | 318/568.16 |

FOREIGN PATENT DOCUMENTS

| | | |
|---|---|---|
| 0151417 | 8/1985 | European Pat. Off. |
| 1-103292 | 4/1989 | Japan |
| 1-121975 | 5/1989 | Japan |

Primary Examiner—Glen R. Swann, III
Attorney, Agent, or Firm—Staas & Halsey

[57] ABSTRACT

A fixed point for confirmation is photographed by a camera prior to the start of a robot job, to obtain photographing data (S1, S2), a position data is determined from the photographing data (S3), and an error ($\Delta\epsilon$) between the position data and a reference position data (S4) is determined. When this error ($\Delta\epsilon$) exceeds a predetermined tolerance ($\epsilon a$), a camera positional dislocation alarm is issued (S6). With this arrangement, the positional dislocation of the camera can be confirmed prior to the start of a job, whereby the job can be safely carried out.

3 Claims, 2 Drawing Sheets

5,274,360

METHOD OF DETECTING POSITIONAL DISLOCATION OF CAMERA

TECHNICAL FIELD

The present invention relates to a method of detecting a positional dislocation of a camera in a robot system, and more specifically, to a method of detecting the positional dislocation of a camera by which the positional dislocation of the camera can be confirmed prior to the start of a job.

BACKGROUND ART

A robot system in which workpieces are photographed by a camera and the position thereof is recognized thereby is now in practical use for carrying out an inspection job, assembly job, palletizing job and the like. The camera is fixed, or mounted on the hand of a robot, for this purpose, and in particular, when the position of the camera is fixed, assembly jobs and the like cannot be carried out if the position of the camera is dislocated.

The normal operation of the robot can be prevented by various causes, including, for example, the dislocation of the relative position of the robot and an object, and errors in a teaching program and the like.

Therefore, when a problem occurs, the elements which may be the cause of the problem must be individually checked, to specify the cause of the problem. Of course, the dislocation of the camera is one of the causes of the problem.

In general, although the frequency of dislocation of the position and attitude of a fixed camera is not high, a slight positional dislocation of the camera would disturb a robot job in which the camera is photographing a distant object. A slight amount of positional dislocation is difficult to easily determine, but when a job is carried out by using the robot without checking the positional dislocation thereof, the operator feels uneasy before the start of the job, as if a problem arises while the robot is being operated, workpieces and the like may be damaged, and this damage is difficult to recover.

Consequently, the positional dislocation of a camera, and the attitude thereof and the like, must be confirmed prior to the start of a job.

DISCLOSURE OF THE INVENTION

Taking the above into consideration, an object of the present invention is to provide a method of detecting the positional dislocation of a camera by which the positional dislocation of the camera can be confirmed by a simple method prior to the start of a job.

To attain the above object, according to the present invention, there is provided a method of detecting a positional dislocation of a camera in a robot system, which comprises the steps of obtaining photographing data by photographing a fixed point for confirmation by the camera, obtaining a position data from the photographing data, determining an error between the position data and a reference position data, and giving a warning of the positional dislocation of the camera when the error exceeds a predetermined tolerance.

The fixed point for confirmation is photographed by the camera prior to the start of a robot job, to obtain photographing data, position data is determined from the photographing data, and then any error between the position data and a reference position data is determined. When the error exceeds the predetermined tolerance, a camera positional dislocation alarm is output, whereby the positional dislocation of the camera can be confirmed.

BEST MODE OF CARRYING OUT THE INVENTION

An embodiment of the present invention will be described below with reference to the drawings.

Figure 2:
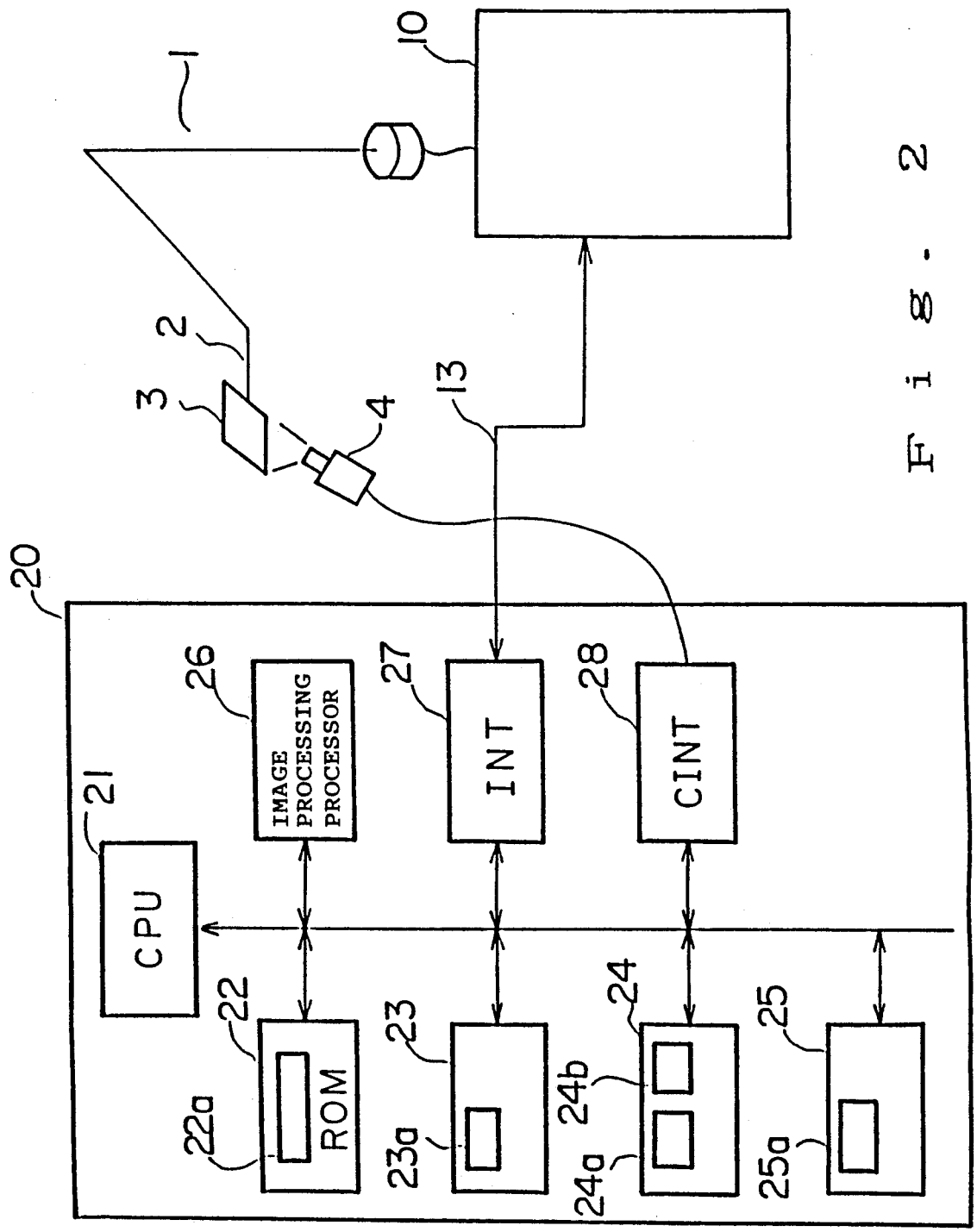
FIG. 2 is a diagram showing the arrangement of a robot system as a whole, embodying a method of detecting the positional dislocation of a camera according to the present invention.

FIG. 2 is a diagram showing the arrangement of a robot system as a whole, embodying a method of detecting the positional dislocation of a camera according to the present invention, wherein a pattern plate 3 is connected to the arm 2 of a robot 1 and the pattern plate 3 is provided with a fixed point for confirming the positional dislocation of a camera 4. Although almost all positional dislocations of the camera 4 can be detected by only one fixed point, two fixed points are provided here for an increased detecting accuracy.

The robot 1 is controlled by a robot control unit 10, which controls the robot 1 to position the pattern plate 3 at a reference position to detect the positional dislocation of the camera 4.

Further, an image processing unit 20 is connected to the camera 4 and detects the positional dislocation of the camera 4 by photographing the pattern plate 3 with the camera 4.

The image processing unit 20 is arranged by using a processor (CPU) 21 as the central component thereof, wherein a ROM 22 stores a control software 22a for processing an image; a program memory 23 stores a positional dislocation confirmation program 23a, to be described later in detail, for confirming the positional dislocation of the camera 4; a data memory 24 stores the reference position data 24a of the fixed point of the pattern plate 3 to be photographed by the camera 4; and, a frame memory 25 stores the photographing data 25a of the fixed point of the pattern plate 3 photographed by the camera 4 through a camera interface (CINT) 28. This photographing data 25a is processed by an image processing processor 26 and supplied to the data memory 24 as a position data 24b.

An interface (INT) 27, used to communicate with the robot control unit 10, receives the positional dislocation confirmation command of the camera 4 from the robot control unit 10 and supplies the positional dislocation alarm signal or normal position signal of the camera 4 to the robot control unit 10.

Next, the positional dislocation confirmation program of the camera 4 will be described.

Figure 1:
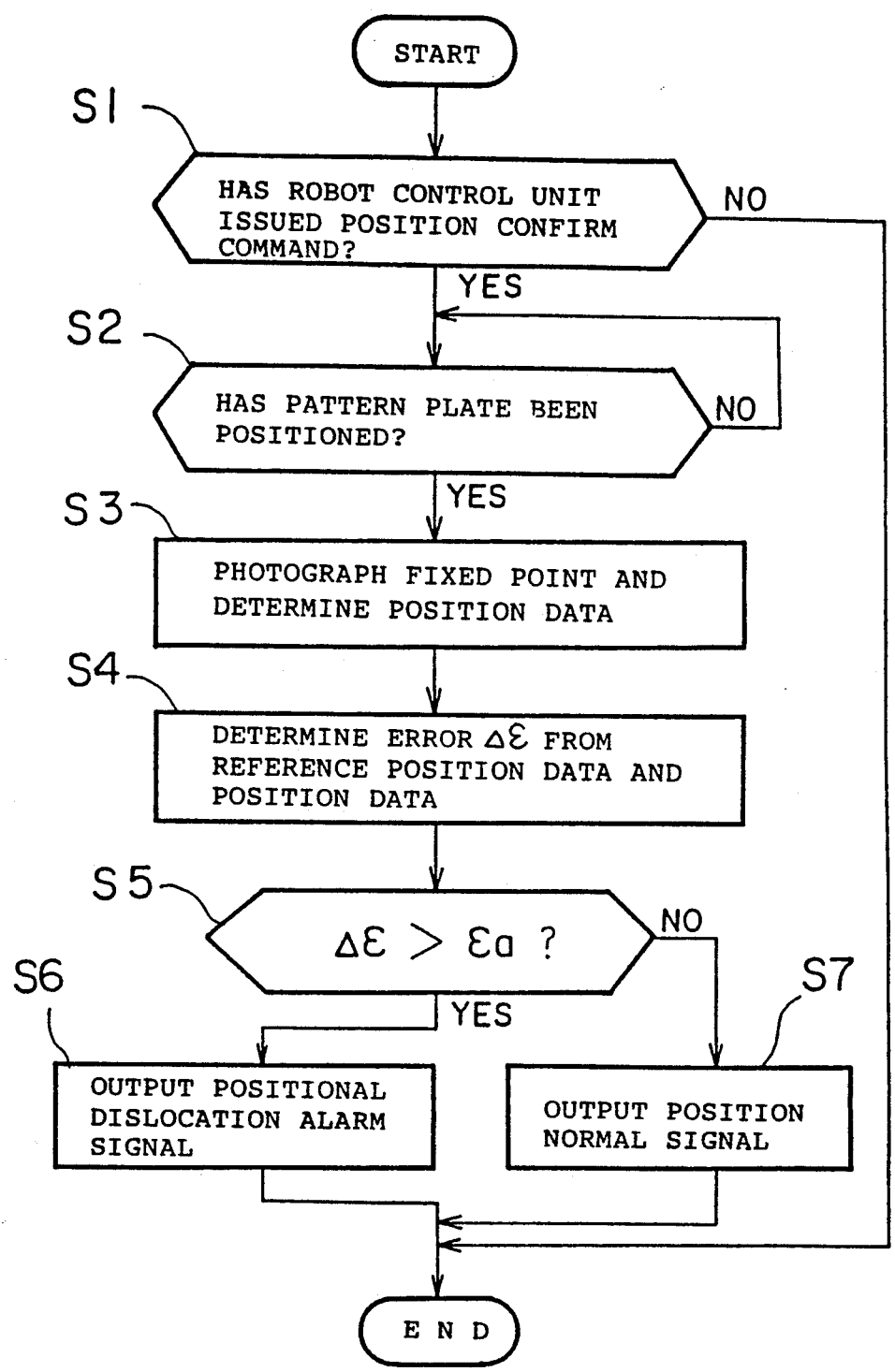
FIG. 1 is a flowchart of a positional dislocation confirmation program.

FIG. 1 is a flowchart of a positional dislocation confirmation program, wherein numerals prefixed with an "S" indicate the number of steps of the routine.

[S1] It is determined whether or not the robot control unit 10 has issued a command for confirming the position of the camera 4, and when the command has been issued, the routine goes to step S2.

[S2] It is determined by the robot control unit 10 whether or not the robot 1 has positioned the pattern plate 3 at the reference position, and when the pattern plate 3 has been positioned there, the routine goes to step S3.

Note, when the pattern plate 3 has been positioned, the robot control unit 10 supplies a positioning completion signal to the image processing unit 20 through the interface 27.

[S3] The fixed positions of the pattern plate 3 is photographed by the camera 4 and the resultant data is fetched by the frame memory 25 as the photographing data 25a, through the camera interface 28. Further, this photographing data 25a is processed by the image processing processor 26 and stored in the data memory 24 as the position data 24b.

[S4] The reference position data 24a is compared with the position data 24b and an error $\Delta\epsilon$ therebetween is determined.

[S5] The error $\Delta\epsilon$ is compared with a tolerance $\epsilon a$, and when the error $\Delta\epsilon$ is greater than the tolerance $\epsilon a$, the routine goes to S6: when the error $\Delta\epsilon$ is not greater than the tolerance $\epsilon a$, the routine goes to S7.

[S6] Since the error $\Delta\epsilon$ is greater than the tolerance $\epsilon a$, the alarm signal warning of a positional dislocation of the camera 4 is supplied to the robot control unit 10.

[S7] A camera position normal signal is supplied to the robot control unit 10.

Upon receiving the positional dislocation alarm signal, the robot control unit 10 displays the positional dislocation alarm signal of the camera 4 at a not shown display unit, by which the operator is notified of the positional dislocation of the camera. Conversely, when the position of the camera 4 is not dislocated, the position normal signal of the camera is supplied to the robot control unit 10 and a display that the position of the camera is not abnormal is given, and thus the operator can start a job without anxiety.

Although the fixed point for photographing is provided with the pattern plate, and the pattern plate is positioned at the reference position by the robot, the fixed point may be provided with a fixed location.

Further, although a positional dislocation alarm signal or position confirmation signal of the camera is supplied to the robot control unit, and a positional dislocation alarm or the like is displayed at the display unit of the robot control unit in the above description, these positional dislocation alarm signals may be supplied to a programmable controller (PC) integrally controlling the robot, and processed thereby.

As described above, according to the present invention, since the positional dislocation of the camera is detected by photographing the fixed position by the camera, whether or not the camera is normally positioned can be confirmed prior to the start of a job, whereby the job can be safely started.

We claim:

1. A method of detecting a positional dislocation of a camera in a robot system, comprising the steps of:
   (a) obtaining photographing data by photographing a fixed point for confirmation by said camera;
   (b) obtaining position data from said photographing data;
   (c) determining an error between said position data and a predetermined reference position; and
   (d) giving an alarm warning of the positional dislocation of said camera when said error exceeds a predetermined tolerance.

2. A method of detecting a positional dislocation of a camera according to claim 1, wherein said fixed point for confirmation is a point set on a pattern plate held by the arm of a robot and said robot positions said pattern plate at a reference position.

3. A method of detecting a positional dislocation of a camera according to claim 1, further comprising the step of (e) confirming the position of said camera based upon where the fixed point is provided.

* * * * *